United States Patent
Theratil et al.

(10) Patent No.: US 10,670,041 B2
(45) Date of Patent: Jun. 2, 2020

(54) COMPRESSOR ROTOR FOR SUPERSONIC FLUTTER AND/OR RESONANT STRESS MITIGATION

(71) Applicant: PRATT & WHITNEY CANADA CORP., Longueuil (CA)

(72) Inventors: Ignatius Theratil, Mississauga (CA); Krishna Prasad Balike, Brampton (CA); Aldo Abate, Longueuil (CA); Sean Kelly, Milton (CA); Peter Townsend, Missisauga (CA); Ronald Dutton, Guelph (CA); Anthony Brown, Mississauga (CA); Paul Stone, Guelph (CA); Myron Klein, Higganum, CT (US); Milica Kojovic, Longueuil (CA); Robert Venditti, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 419 days.

(21) Appl. No.: 15/436,091

(22) Filed: Feb. 17, 2017

(65) Prior Publication Data
US 2017/0241432 A1    Aug. 24, 2017

Related U.S. Application Data

(60) Provisional application No. 62/297,376, filed on Feb. 19, 2016.

(51) Int. Cl.
*F04D 29/32*      (2006.01)
*F04D 29/66*      (2006.01)
(Continued)

(52) U.S. Cl.
CPC .............. *F04D 29/327* (2013.01); *F02K 3/06* (2013.01); *F04D 19/002* (2013.01); *F04D 21/00* (2013.01);
(Continued)

(58) Field of Classification Search
CPC .... F04D 29/327; F04D 29/666; F04D 29/324; F04D 29/328; F01D 5/10; F01D 5/16;
(Continued)

(56) References Cited

U.S. PATENT DOCUMENTS

| 3,347,520 | A | * | 10/1967 | Oweczarek | F01D 5/14 |
| | | | | | 415/119 |
| 3,689,178 | A | * | 9/1972 | Faber | B64C 3/26 |
| | | | | | 416/224 |

(Continued)

FOREIGN PATENT DOCUMENTS

| EP | 1211383 | 6/2002 |
| EP | 2896791 A1 | 7/2015 |

(Continued)

OTHER PUBLICATIONS

Lepicovsky, Jan. Fan Stall Flutter Flow Mechanism Studied, 2002, accessed from https://ntrs.nasa.gov/archive/nasa/casi.ntrs.nasa.gov/20050205647.pdf (Year: 2002).*

(Continued)

*Primary Examiner* — Moshe Wilensky
*Assistant Examiner* — Topaz L. Elliott
(74) *Attorney, Agent, or Firm* — Norton Rose Fulbright Canada LLP

(57) ABSTRACT

A compressor rotor, such as a fan, for a gas turbine engine is described which includes alternating at least first and second blade types. The leading edge of the second blade types includes a leading edge tip cutback extending to the blade tip thereof. The leading edge tip cutback of the second blade type defines a chord length at the blade tip of the second blade types that is less than that of the first blades types. The first and second blade types generate different shock patterns when the fan or compressor rotor operates in supersonic flow regimes.

16 Claims, 5 Drawing Sheets

(51) Int. Cl.
F04D 21/00 (2006.01)
F02K 3/06 (2006.01)
F04D 19/00 (2006.01)

(52) U.S. Cl.
CPC ......... F04D 29/324 (2013.01); F04D 29/666 (2013.01); *F05D 2220/36* (2013.01); *F05D 2240/302* (2013.01); *F05D 2240/303* (2013.01); *F05D 2240/307* (2013.01); *F05D 2260/961* (2013.01)

(58) Field of Classification Search
CPC . F01D 5/141; F05D 2260/91; F05D 2240/302
USPC .................................................. 416/203, 228
See application file for complete search history.

(56) References Cited

U.S. PATENT DOCUMENTS

| | | | |
|---|---|---|---|
| 4,097,192 A | | 6/1978 | Kulina |
| 4,878,810 A | | 11/1989 | Evans |
| 5,286,168 A | | 2/1994 | Smith |
| 5,966,525 A | | 10/1999 | Manzi et al. |
| 6,042,338 A | * | 3/2000 | Brafford ............... F01D 5/10 29/889 |
| 6,183,197 B1 | | 2/2001 | Bunker et al. |
| 6,379,112 B1 | | 4/2002 | Montgomery |
| 6,428,278 B1 | * | 8/2002 | Montgomery ........... F01D 5/10 416/203 |
| 6,471,482 B2 | | 10/2002 | Montgomery et al. |
| 6,648,602 B2 | * | 11/2003 | Horng ............... F04D 29/327 416/203 |
| 6,666,653 B1 | * | 12/2003 | Carrier ................ F01D 5/3061 29/889.21 |
| 6,976,826 B2 | | 12/2005 | Roy et al. |
| 7,024,744 B2 | | 4/2006 | Martin et al. |
| 7,207,772 B2 | | 4/2007 | Johann |
| 7,234,914 B2 | | 6/2007 | Usab et al. |
| 7,643,975 B2 | | 1/2010 | Vahdati et al. |
| 7,648,330 B2 | | 1/2010 | Schwaller et al. |
| 7,766,726 B2 | * | 8/2010 | Sherlock ............... B23C 3/18 451/121 |
| 7,878,759 B2 | | 2/2011 | Mills et al. |
| 8,043,063 B2 | * | 10/2011 | Kelly ..................... F01D 5/10 415/119 |
| 8,172,510 B2 | | 5/2012 | Duong et al. |
| 8,540,490 B2 | | 9/2013 | Ramakrishnan et al. |
| 8,656,589 B2 | | 2/2014 | Kurt-Elli |
| 8,678,752 B2 | | 3/2014 | Delvaux et al. |
| 9,062,554 B2 | | 6/2015 | Bielek |
| 9,097,125 B2 | | 8/2015 | Ghorbani et al. |
| 9,121,284 B2 | | 9/2015 | Pope |
| 9,382,916 B2 | * | 7/2016 | Schoenenborn ........ F01D 5/005 |
| 9,683,447 B2 | | 6/2017 | Gentile et al. |
| 9,701,394 B2 | | 7/2017 | Linch |
| 9,932,840 B2 | | 4/2018 | Fulayter et al. |
| 2002/0064458 A1 | | 5/2002 | Montgomery et al. |
| 2006/0073022 A1 | | 4/2006 | Gentile et al. |
| 2008/0134504 A1 | * | 6/2008 | Schoenenborn ........ F01D 5/005 29/889.1 |
| 2010/0232970 A1 | | 9/2010 | Murooka et al. |
| 2010/0247310 A1 | | 9/2010 | Kelly et al. |
| 2013/0142659 A1 | | 6/2013 | Glaspey |
| 2013/0170947 A1 | | 7/2013 | Kurt-Elli et al. |
| 2013/0195652 A1 | | 8/2013 | Pope |
| 2013/0202444 A1 | | 8/2013 | Wunderer |
| 2014/0294595 A1 | | 10/2014 | Carroll et al. |
| 2014/0314548 A1 | | 10/2014 | Rivers et al. |
| 2015/0139789 A1 | | 5/2015 | Schoenenborn |
| 2015/0198047 A1 | * | 7/2015 | Roche ...................... F01D 5/16 60/805 |
| 2015/0292337 A1 | | 10/2015 | Gentile et al. |
| 2015/0322803 A1 | | 11/2015 | Fulayter et al. |
| 2016/0017796 A1 | | 1/2016 | Xu et al. |
| 2016/0053617 A1 | | 2/2016 | Grelotti et al. |
| 2016/0208823 A1 | | 7/2016 | Chrabascz et al. |
| 2016/0290137 A1 | * | 10/2016 | Li ......................... F04D 29/324 |
| 2016/0305251 A1 | | 10/2016 | Fielding |
| 2016/0333894 A1 | * | 11/2016 | K .......................... F04D 29/542 |
| 2017/0058680 A1 | | 3/2017 | Chouhan et al. |
| 2017/0175761 A1 | | 6/2017 | Schwarz et al. |
| 2017/0175776 A1 | | 6/2017 | Theratil et al. |
| 2017/0241432 A1 | | 8/2017 | Theratil et al. |
| 2017/0284207 A1 | | 10/2017 | Naik et al. |
| 2017/0343015 A1 | | 11/2017 | Nolcheff et al. |
| 2018/0038382 A1 | | 2/2018 | Foster et al. |
| 2018/0080450 A1 | | 3/2018 | Glavicic |
| 2018/0209275 A1 | | 7/2018 | Abrari |
| 2018/0274557 A1 | * | 9/2018 | Theratil ................. F04D 29/327 |
| 2018/0274558 A1 | * | 9/2018 | Theratil ................. F04D 29/327 |
| 2018/0274559 A1 | * | 9/2018 | Theratil ................. F04D 29/325 |
| 2019/0017385 A1 | * | 1/2019 | Opoka .................... F01D 5/142 |

FOREIGN PATENT DOCUMENTS

| | | |
|---|---|---|
| EP | 3075955 | 10/2016 |
| EP | 2072758 | 11/2016 |
| GB | 2490127 | 10/2012 |
| JP | 2003106295 | 4/2003 |
| WO | 2014130332 | 8/2014 |
| WO | 2015023325 | 2/2015 |
| WO | 2014197119 | 3/2015 |
| WO | 2015112305 | 7/2015 |
| WO | 2017153219 | 9/2017 |

OTHER PUBLICATIONS

Department of the Army. Aviation Unit and Aviation Intermediate Maintenance Manual: Engine, Aircraft, Gas Turbine, Model T63-A-720, P/N6887191, NSN 2840-01-013-1339 Department of the Army technical manual, 1977. accessed from https://books.google.com/books?id=r5E8TviQyhQC (Year: 1977).*

European Search Report dated Jul. 6, 2017, EP Application No. 171570120.

Extended European Search Report, dated May 16, 2017, EP patent application No. 16189345.8.

* cited by examiner

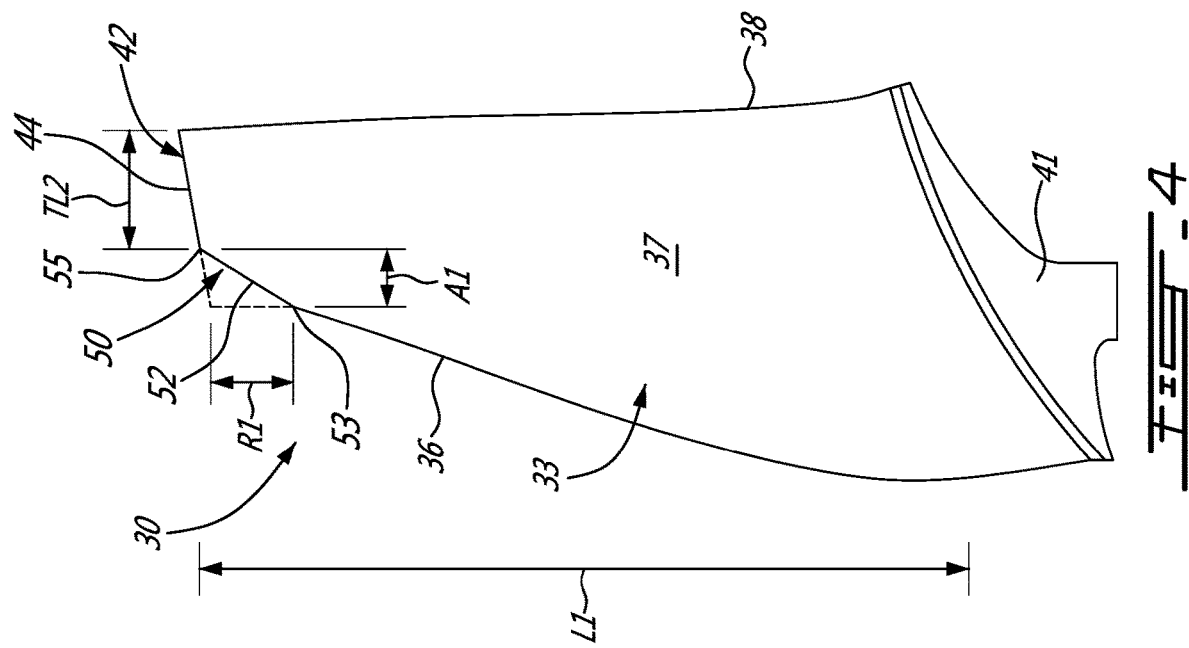
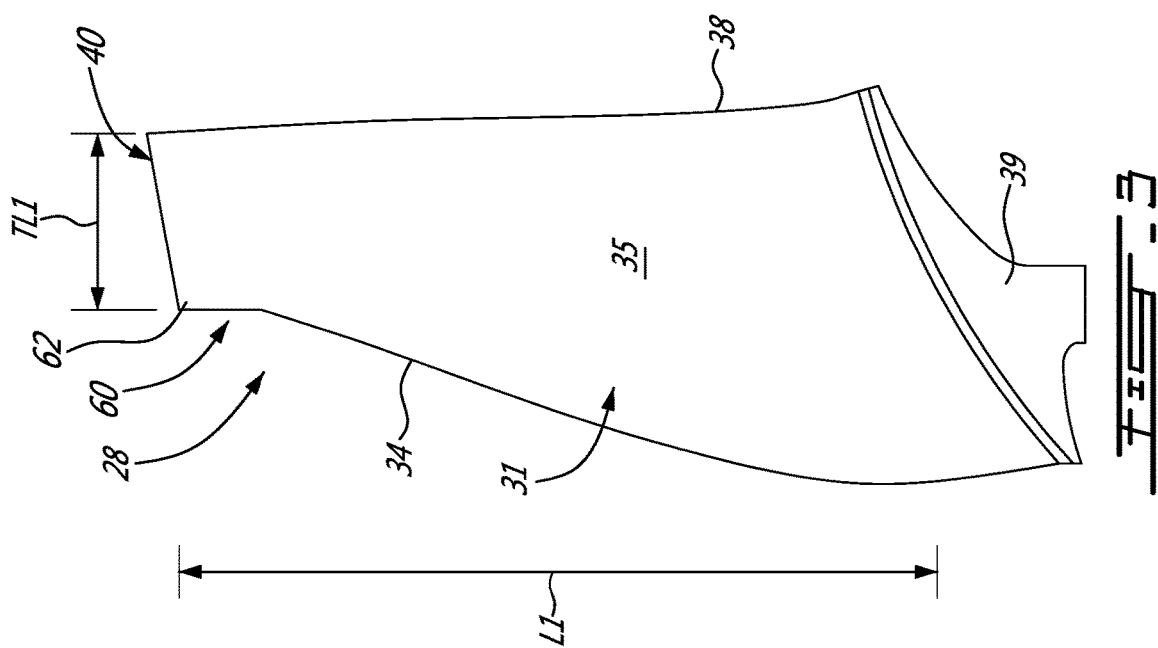

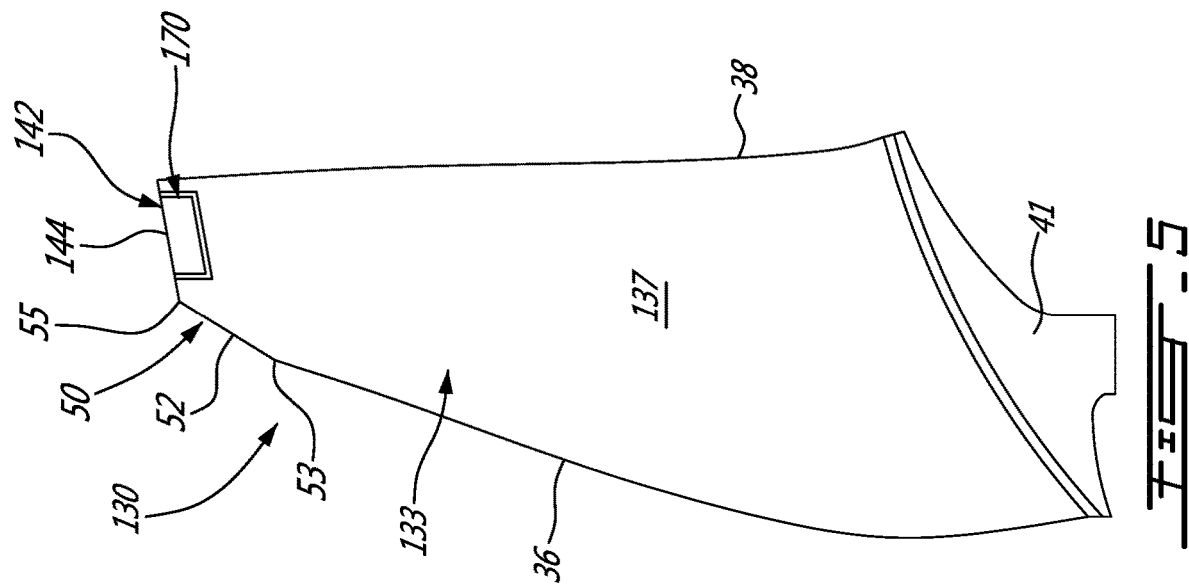

COMPRESSOR ROTOR FOR SUPERSONIC FLUTTER AND/OR RESONANT STRESS MITIGATION

CROSS-REFERENCED TO RELATED APPLICATIONS

The present application claims priority on U.S. Patent Application No. 62/297,376 filed Feb. 19, 2016, the entire content of which is incorporated by reference herein.

TECHNICAL FIELD

The application relates generally to rotating airfoils for gas turbine engines and, more particularly, to compressor rotors of gas turbine engines.

BACKGROUND

Compressor rotors of gas turbine engines, such as the fan of a turbofan for example, may experience two main types of aerodynamic instability: stall flutter and supersonic flutter, as shown in FIG. 6.

Supersonic flutter (which can be either stalled or unstalled, as shown in FIG. 6) occurs in the high speed regime of the compressor where tip speed is very high. Supersonic flutter can cause an operational barrier which makes it difficult to simply accelerate through a speed range in order to avoid and/or limit the effects of supersonic flutter once it occurs. Supersonic flutter may occur under certain flight conditions. Prolonged operation of a compressor rotor undergoing supersonic flutter can produce a potentially undesirable result, such as airfoil stress load levels exceeding threshold values and/or resonant stresses.

Improvement is therefore sought.

SUMMARY

There is accordingly provided a compressor for a gas turbine engine, the compressor comprising a compressor rotor having compressor blades circumferentially distributed around a hub and extending radially outward from the hub to blade tips, the compressor blades including alternating at least first and second compressor blades each having an airfoil with a pressure side and a suction side, the pressure side and suction side extending on opposed sides of the airfoils between a leading edge and a trailing edge, the leading edge of the second compressor blades including a leading edge tip cutback extending to the blade tip, wherein the leading edge tip cutback defines a chord length at the blade tip of the second compressor blades that is less than a chord length at the blade tip of the first compressor blades.

There is also provided a compressor for a gas turbine engine, the compressor comprising a compressor rotor having a hub from which a plurality of airfoil blades extend to outer blade tips, the airfoil blades each having an airfoil selected from at least first and second airfoil types and arranged on the hub as alternating with one another around the circumference of the rotor, the second airfoil types including a leading edge having a leading edge tip cutback extending to the outer blade tip thereof, wherein the leading edge tip cutback defines a chord length at the blade tip of the second airfoil types that is less than a chord length at the blade tip of the first airfoil types, the first and second airfoil types generating different shock patterns when the compressor rotor operates in supersonic flow regimes.

There is further provided a method of forming a compressor rotor for a gas turbine engine, the method comprising the steps of: obtaining a plurality of blades of a first blade type, the first blade type having an airfoil with a first airfoil definition; obtaining a plurality of blades of a second blade type, the second blade type having an airfoil with a second airfoil definition, the second airfoil definition having a different outer blade tip profile relative to the first airfoil definition, the outer blade tip profile of the second airfoil definition comprising at least a leading edge tip cutback at a leading edge thereof, the leading edge tip cutback of the second airfoil definition extending to an blade tip of the second blade type to form a chord length at the blade tip of the second blade type that is less than a chord length at the blade tip of the first blade type; and forming the compressor rotor having the blades of said first and second blade types circumferentially alternating around a hub of the rotor, wherein the first and second blade types generate different shock patterns when the compressor rotor operates in supersonic flow regimes to mitigate at least one of supersonic flutter and resonant stresses of the compressor rotor.

BRIEF DESCRIPTION OF THE DRAWINGS

Reference is now made to the accompanying figures, in which:

FIG. 3 is a side elevational view of the first fan blade of the fan rotor of FIG. 2;

FIG. 4 is a side elevational view of an embodiment of the second fan blade of the fan rotor of rotor of FIG. 2;

FIG. 5 is a side elevational view of an alternate embodiment of the second fan blade of the fan of FIG. 2.

DETAILED DESCRIPTION

Figure 1:
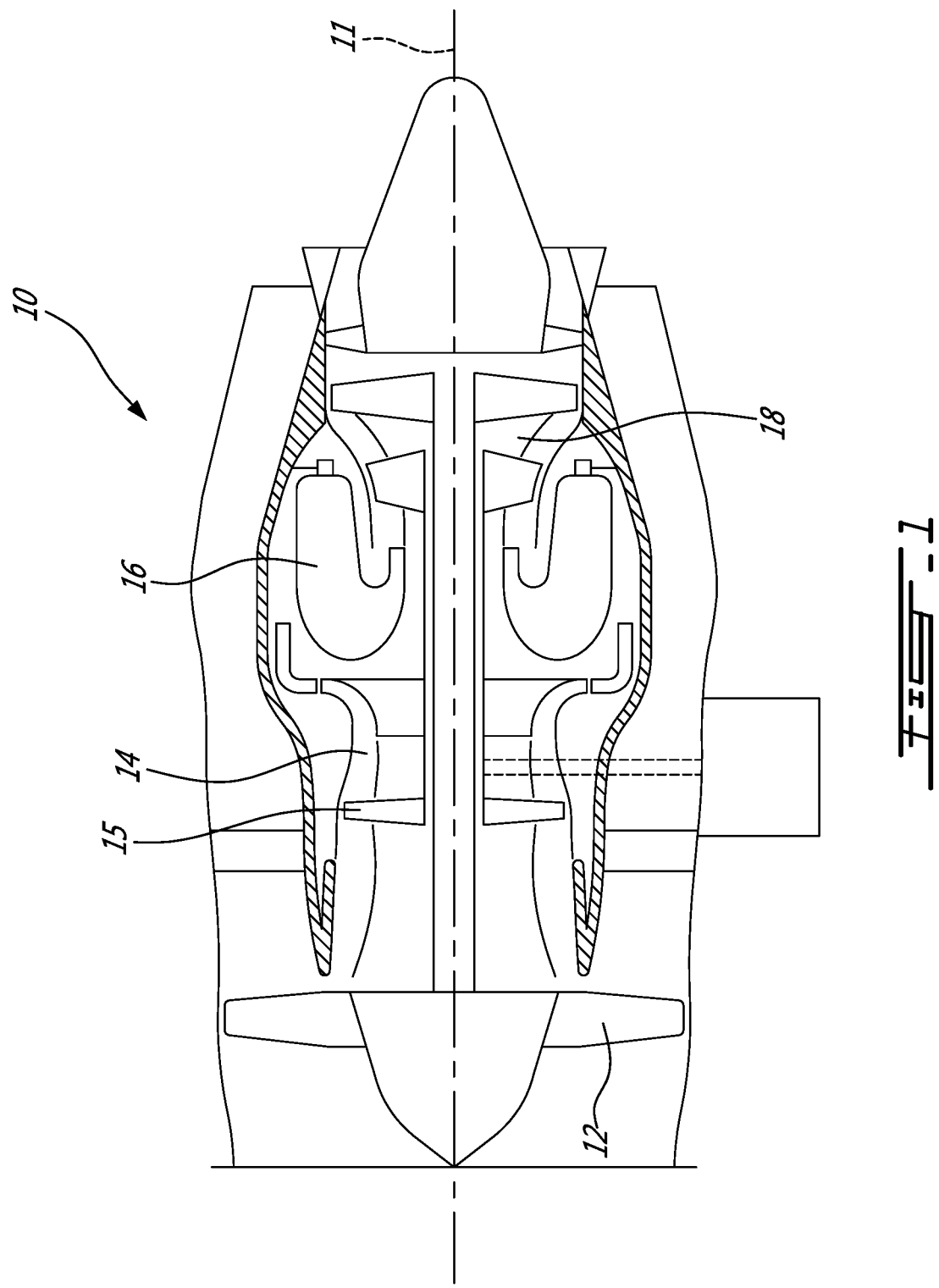
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 having compressor blades 15 for pressurizing the air, a combustor 16 in which the compressed air is mixed with fuel and ignited for generating an annular stream of hot combustion gases, and a turbine section 18 for extracting energy from the combustion gases. Although the example below is described as applied to a fan 12 of such a turbofan engine 10, it will be understood the present teachings may be applied to any suitable compressor rotor and/or compressor airfoil blade of a gas turbine engine.

Figure 2:
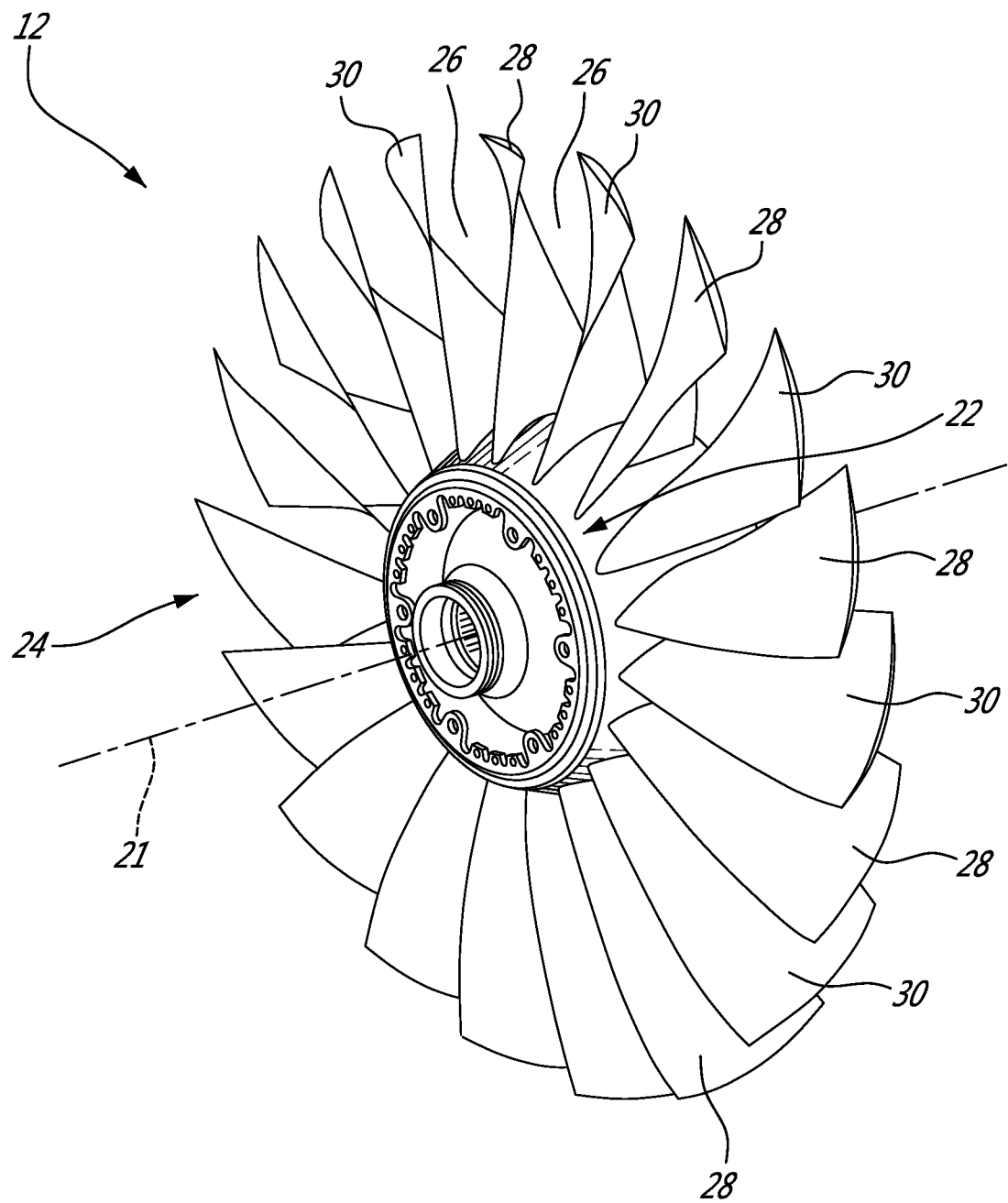
FIG. 2 is a perspective view of a fan rotor of the gas turbine engine shown in FIG. 1, the fan rotor having a plurality of circumferentially alternating first and second fan blades.

FIG. 2 illustrates a fan 12 of the gas turbine engine 10, which is sometimes referred to as a first stage or low pressure compressor. The term "compressor rotor" may therefore be used herein to include rotors, having compressor blades 14, within the compressor 14 of the engine 10, as well as the fan 12 at the upstream, inlet, end of the engine 10.

Referring to FIG. 2, the fan 12 includes a central hub 22, which in use rotates about an axis of rotation 21, and a circumferential row of fan blades 24 that are circumferentially distributed and which project from the hub 22 in a span-wise direction (which may be substantially radially). The axis of rotation 21 of the fan 12 may be coaxial with the main engine axis 11 of the engine 10 as shown in FIG. 1. The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. Each circumferentially adjacent pair of the fan blades defines an inter-blade passages 26 therebetween for the working fluid.

The circumferential row of fan blades 24 of the fan 12 includes two or more different types of fan blades 24, in the sense that a plurality of sets of blades are provided, each of these sets having airfoils with non-trivially different properties, including but not limited to aerodynamic properties in general and shock patterns more specifically. These two or more different types of fan blades 24 are composed, in this example, of circumferentially alternating sets of fan blades, each set including at least first fan blade 28 and a second fan blade 30 (the fan blades 28 and 30 respectively having airfoils 31 and 33 which are different from one another, as described above and in further detail below). Thus, the exemplary row of fan blades 24 includes blade types A, B, A, B, etc., in circumferentially successive order.

In the exemplary embodiment of FIG. 2, the fan 12 therefore includes circumferentially alternating sets of fan blades 24, each set including two different fan blade types, namely blades 28 and 30. It is to be understood, however, that each of these sets of fan blades 24 may include more than two different blade types, and need not comprise pairs, or even numbers, of blade types. For example, each set of fan blades may include three or more fan blades which differ from each other (e.g. a circumferential distribution of the fan blades may include, in circumferentially successive order, blade types: A, B, C, A, B, C; or A, B, C, D, A, B, C, D, etc., wherein each of the capitalized letters represent different types of blades as described above). The embodiment described below includes, for the sake of simplicity of explanation, a fan 12 having circumferentially alternating sets of fan blades each composed of only two different blade types, namely blades 28 (e.g. blade type "A") and 30 (e.g. blade type "B"). This constitutes, accordingly, a circumferential distribution of fan blades in this example which follows a circumferential sequence of blade types A, B, A, B, etc.

Referring still to FIG. 2, in the depicted embodiment, each of the circumferentially repeating sets of fan blades thus includes two different fan blade types 28 and 30. The fan blade row 24 therefore has an even number of fan blades and is composed of circumferentially alternating sets of fan blades, each set being composed of a first fan blade 28 and a second fan blade 30, and the sets alternate, for example successively (e.g. first blade 28, second blade 30, first blade 28, second blade 30, etc.), about the circumference of the hub 22 to provide the circumferential fan blade row 24. Accordingly, in this embodiment, each blade of the first type (e.g. blade 28) is located between two blades of the second type (e.g. blade 30). However, any of the alternate arrangements as described above may also be provided.

Figure 6:
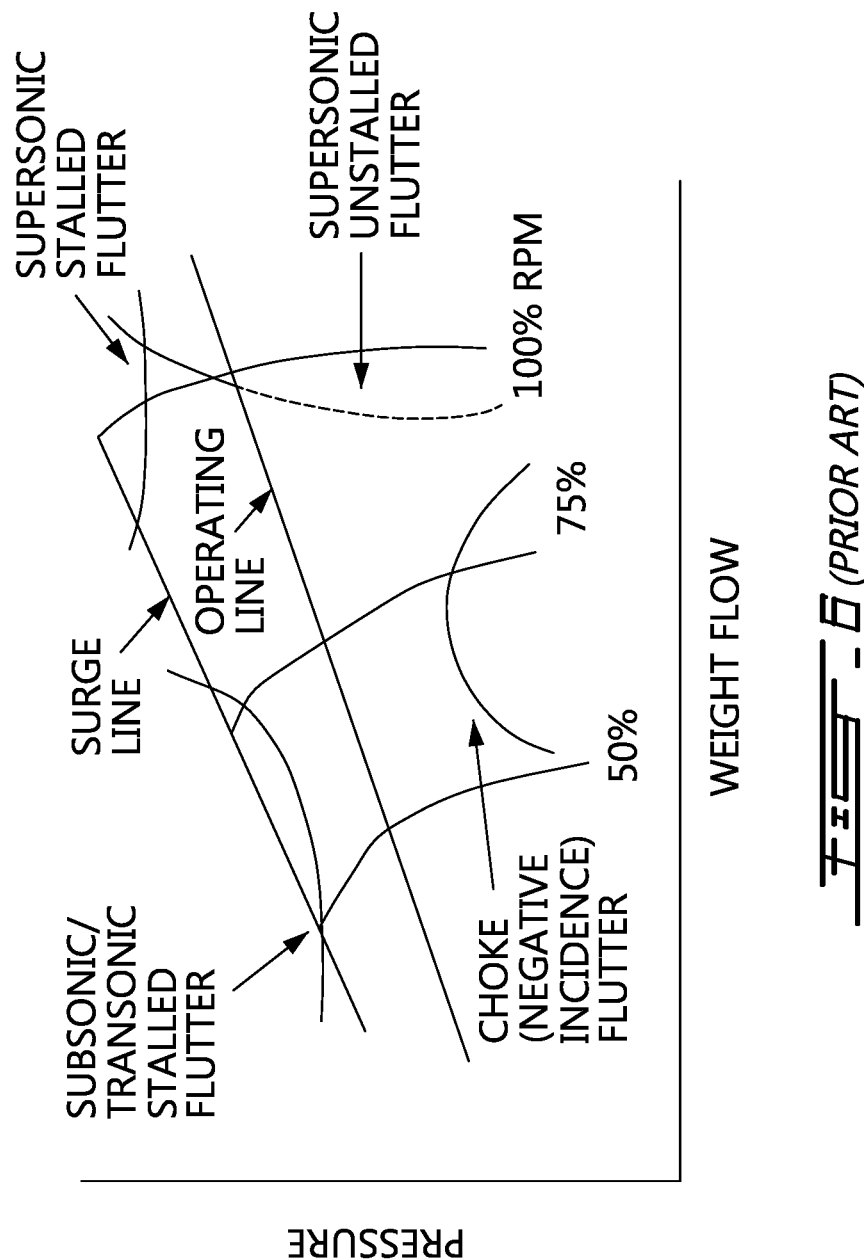
FIG. 6 is a prior art graph illustrating the known types of fan blade flutter, including the supersonic flutter regime, the graph showing weight flow on the X-axis and pressure on the Y-axis.

As mentioned above and with reference to FIG. 6, compressor rotors of gas turbine engines, such as fans of turbofan gas turbine engines, are known to experience two main types of aerodynamic instability: subsonic/transonic stalled flutter; and supersonic flutter. Subsonic stall flutter occurs when two or more adjacent blades in a blade row vibrate at a frequency close to their natural vibration frequency and the vibration motion between the adjacent blades is substantially in phase, and, if this occurs at all, it typically occurs over a narrow speed range, often just below design speed conditions. In contrast, supersonic flutter (which can be either stalled or unstalled) occurs in the high speed regime of the fan (i.e. high weight flow of air) where tip speed of the fan blades is very high. Unlike stall flutter, supersonic flutter can cause an operational barrier—i.e. unlike with subsonic stall flutter, it is not possible to accelerate through a narrow affected speed range in order to stop and/or limit the effects of supersonic flutter once it occurs. Most prior art attempts to address flutter have concentrated on the problem of subsonic or transonic stall flutter.

Supersonic flutter may also occur when there exists frequency resonance between the blades of a fan, and attempts have been made to solve this by providing a frequency separation between the natural vibration frequencies of adjacent blades of the fan. This is described in U.S. patent application Ser. No. 14/976,701 filed Dec. 21, 2015, the entire contents of which are incorporated by reference herein, wherein the thickness of adjacent airfoil are adjusted to change the natural vibrational frequency of the blades relative to one another. As taught therein, a natural vibrational frequency separation between the adjacent blades of a set may be sufficient to reduce or impede unwanted resonance between the blades, by controlling a difference in natural frequency between adjacent airfoil blades.

In contrast, the fan of the present disclosure is specifically intended to address the issue of supersonic flutter, as well as resonant stresses which may occur within the fan blades. Such flow induced resonant stresses can occur in compressor rotors, especially but not exclusively during cross-wind operating conditions which may result in sudden nacelle ingestion of flow vortices. These issues are addressed, in accordance with the present disclosure, by providing leading edge (LE) cutbacks at the outer tip of the alternating blades of the fan.

Supersonic flutter and/or resonant stresses (both in supersonic and in transonic or subsonic regimes) may be mitigated, as described herein, by providing sets of fan blades, each of the blades of the set having aerodynamic properties which differ from each other as described in further detail below. As compressor blades, including fan blades, typically decrease in thickness from root to tip and vibration amplitude is typically inversely proportional to stiffness and thus thickness, resonance problems such as supersonic flutter and any resonant stresses caused may mostly occur on the outer half of the blade span, and more particularly on the outer 20% of span. As such, the LE tip cutbacks 50 of the compressor rotors of the present application, as will now be described in detail, are disposed within a radially outermost 20% of a total span length of the fan blades that are modified to have such LE tip cutbacks 50.

Referring now to FIGS. 3 to 4, the first and second fan blades 28 and 30 of the fan 12 respectively include the first and second airfoils 31 and 33, which each extend in a span-wise direction substantially the same overall span-wise length L1 from their inner blade hubs 39 and 41 to their outer blade tips 40 and 42, respectively. The first and second fan blades 28 and 30 also respectively define pressure side surfaces (or simply "pressure surfaces") 35 and 37. The trailing edges 38 of each of the first and second airfoils 31 and 33 may be substantially the same, and thus denoted herein by the same reference numeral.

However, as can be seen from FIGS. 3 and 4, the first and second fan blades 28 and 30 as described herein have different leading edges 34 and 36, respectively. More particularly, the leading edge (LE) 36 of the second airfoil 33 of the second fan blade type 30 is formed having a tip "cutback" portion 50, proximate the tip 42 thereof. This cutback portion 50 of the tip 42 (i.e. a local region of reduced chord length at the blade tip) is hereinafter defined as the "LE tip cutback 50". The LE tip cutback 50 is disposed only on the LE 36 of the second fan blade 30, and only at and/or near the outer tip 42 of the airfoil 33. More particularly, in an exemplary embodiment, the leading edge tip cutback 50 is disposed within a radially outermost 20% of the total span length L1 of the second fan blade 30. In other words, in this embodiment, the leading edge tip cutback 50 is located within 80% to 100% of the total span length L1. In another more specific embodiment, the leading edge tip cutback 50 is disposed within a radially outermost 15% of the total span length L1 of the second fan blade 30, in which case the leading edge tip cutback 50 is located within 85% to 100% of the total span length L1.

Accordingly, due to the LE tip cutback 50 as described herein, a chord length at the blade tip TL2 of the second fan blades 30 is less than a chord length at the blade tip TL1 of the first fan blades 28. More particularly, in an exemplary embodiment, the chord length at the blade tip LT2 of the second fan blades 30 is greater than 75% and less than 100% of the chord length at the blade tip LT1 of the first fan blades 28. Stated differently, the chord-wise length of the LE tip cutback 50 itself (identified as "A1" in FIG. 4) on the second fan blades 30 is less than 25% of the total chord length at the blade tip LT1 of the first fan blades 28. In another embodiment, the chord length at the blade tip LT2 of the second fan blades 30 is greater than 80% (and less than 100%) of the chord length at the blade tip LT1 of the first fan blades 28, in which case the chord-wise length A1 of the LE tip cutback 50 itself is less than 20% of the total chord length at the blade tip LT1 of the first fan blades 28. In a further more specific embodiment, the chord length at the blade tip LT2 of the second fan blades 30 is about 88% of the chord length at the blade tip TL1 of the first fan blades 28 (and thus the chord-wise length A1 of the LE tip cutback 50 itself is about 12% of the total chord length at the blade tip LT1).

Although a number of different sizes and shapes of the LE tip cutback 50 are possible, in at least the embodiment of FIG. 4, the LE tip cutback 50 defines a leading edge portion 52 which extends substantially linearly between an upstream inflection point 53, located at the junction with the main leading edge 36, and a downstream inflection point 55, located at the junction with the outer edge 44 of the tip 42. Accordingly, the leading edge portion 52 of the LE tip cutback 50 is disposed somewhat aft, or set back, relative to the main leading edge 36 of the second airfoil 33, and extends in the downstream direction from the upstream inflection point 53, which is the point at which the leading edge portion 52 of the LE tip cutback 50 diverts away from the main leading edge 36 of the remainder of the airfoil 33.

It is to be understood that the angle or degree of LE tip cutback 50 may be less drastic than that depicted in FIG. 4, in which the LE tip cutback 50 has been slightly exaggerated for ease of explanation and understanding. More particularly, for example, the LE tip cutback 50 may in fact define a profile that is substantially in line with and a continuation of that of the main airfoil leading edge 36, in which case the leading edge portion 52 of the LE tip cutback 50 may be much less rearwardly angled and thus much more "upright"—that is radially extending. As can be seen from FIG. 3, the LE tip 60 of the first airfoils 31 of the adjacent first fan blades 28 may form an axially forwardly extending portion, or "beak", which extends upstream (i.e. axially forwardly) relative to a baseline leading edge 34 of the majority of the airfoil 35 of the first fan blades 28. As such, the LE tip cutback 50 of the second airfoils 33 of the second fan blades 30 may simply represent a removal of this forwardly projecting beak 62 which is present in the first fan blades 28.

As can be seen in FIG. 4, the LE tip cutback 50 defines a span-wise length R1 in a radial direction and a chord-wise length in an axial direction A1. In one embodiment, the span-wise length R1 of the LE tip cutback 50 is greater than the chord-wise length A1 of the LE tip cutback 50. Thus, for example, in an exemplary embodiment where the LE tip cutback 50 has a span-wise length R1 of about 2 inches and a chord-wise length A1 of about 1 inch, the linear edge 52 extending between the upstream and downstream inflection points 53, 55 would be approximately 2.236 inches in length.

Referring now to FIG. 5, a single fan blade 130 in accordance with an alternate embodiment which may be used on the fan 12 in place of the second fan blade 30 described above. This alternate second fan blade 130 of FIG. 5 is similar to the second fan blade 30, as shown in FIG. 4, in that it also includes a LE tip cutback 50 as described above, but it is additionally provided with a pressure side tip pocket (or simply "tip pocket") 170. The tip pocket 170 is located at the tip 142 of the blade 130 and extends radially inwardly from the outer edge 144 of the tip 142 on the pressure side surface 137 of the airfoil 133. This pressure side tip pocket 170 may further contribute, in addition to the LE tip cutback 50, with the formation of offset shock patterns on the blade 130 which differ from that of the "un-modified" blades 28 adjacent thereto in a blade row 24 on the fan 12.

Regardless of which of the second fan blades 30 or 130 are used between each of the "un-modified" blades 28 of the fan 12, the different and/or staggered shock positions or patterns formed by the first blades 28 and the second blades 30, 130, respectively, are believed to modify the relative aerodynamic damping of each alternate blade, thereby reducing the aerodynamic instability of the fan 12 and thus mitigating any supersonic flutter and/or resonant stresses to which the fan may be exposed. As such, the circumferentially alternating fan blades 28 and 30,130 are thus aerodynamically "tuned" to ensure different shock patterns between adjacent blades. This has been found to help mitigate supersonic flutter and/or resonant stresses.

Although the fan 30 of FIG. 4 includes a LE tip cutback 50 and the blade 130 of FIG. 5 includes both a LE tip cutback 50 and a tip pocket 170 on the pressure side 137 of the airfoil 133, it is to be understood that one or more blades 24 of the fan 12 may alternately comprise only a pressure side tip pocket 170 but not a LE tip cutback 50. It is also be to understood that in an alternate embodiment, the first blade 28 may include one of the LE tip cutback 50 and the pressure side tip pocket 170, and the second blade 30 may include the other of the he LE tip cutback 50 and the pressure side tip pocket 170 (i.e. that each of the alternating blades 28 and 30 may have different aerodynamic modifiers as described herein, in order to provide different shock patterns which may accordingly mitigate supersonic flutter and/or resonant stresses of the fan 12. The LE tip cutback 50 and/or the pressure side tip pocket 170 may be created either or both of the blades 28, 30 as originally produced or may be subsequently formed in existing blades, for example as a repair for post-production modification. In the embodiment depicted, the LE tip cutback 50 and/or the pressure side tip pocket 170 may be formed by removing material (such as by machining) from the leading edges 34, 36 and the pressure sides 35, 37 of the airfoils 31, 33, at or near the tips 40, 42 thereof.

The above description is meant to be exemplary only, and one skilled in the art will recognize that changes may be made to the embodiments described without departing from the scope of the described subject matter. Although described above specifically with respect to a fan of a turbofan gas turbine engine, it will be understood that the above-described subject matter relating to the mitigation of supersonic flutter and/or resonant stress susceptibility of rotors comprising airfoils can also be applied to other gas turbine engine rotors, including for example the low pressure compressor rotors of such engines, whether turbofan, turboprop or turboshaft engines for example. Further, the compressor rotors described herein may be integrally-bladed rotors (IBRs) or removable-blade rotors. It is also be understood that the above-described bladed rotors may be employed in other applications or contexts, such that the principles described herein may be applied to provide any suitable airfoil in any suitable mechanical system operating in any suitable fluid. Other modifications which fall within the scope of the described subject matter will be apparent to those skilled in the art, in light of a review of this disclosure, and such modifications are intended to fall within the appended claims.

The invention claimed is:

1. A gas turbine compressor for an aircraft gas turbine engine, the gas turbine engine compressor comprising a compressor rotor having compressor blades circumferentially distributed around a hub and each extending radially outward from the hub to a blade tip, the compressor blades including a first compressor blade and a second compressor blade alternating continuously around a circumference of the compressor rotor, each first compressor blade and each second compressor blade having an airfoil with a pressure side and a suction side, the pressure side and suction side extending on opposed sides of the airfoil between a leading edge and a trailing edge, the second compressor blade including at least one tip cutback, the first compressor blade and the second compressor blade being identical but for the at least one tip cutback on the second compressor blade, the at least one tip cutback including a leading edge tip cutback formed in the leading edge of the second compressor blade and extending to the blade tip, wherein the leading edge tip cutback defines a chord length at the blade tip of the second compressor blade that is less than a chord length at the blade tip of the first compressor blade, and the leading edge tip cutback is disposed within a radially outermost 15% of the total span length of the second compressor blade.

2. The gas turbine compressor of claim 1, wherein the chord length at the blade tip of the second compressor blade is greater than 75% and less than 100% of the chord length at the blade tip of the first compressor blade.

3. The gas turbine compressor of claim 2, wherein the chord length at the blade tip of the second compressor blade is greater than 80% of the chord length at the blade tip of the first compressor blade.

4. The gas turbine compressor of claim 1, wherein the leading edge tip cutback has a span-wise length and a chord-wise length, the span-wise length of the leading edge tip cutback is greater than the chord-wise length of the leading edge tip cutback.

5. The gas turbine compressor of claim 1, wherein a chord-wise length of the leading edge tip cutback on the second compressor blade is less than 25% of the chord length at the blade tip of the first compressor blade.

6. The gas turbine compressor of claim 5, wherein the chord-wise length of the leading edge tip cutback on the second compressor blade is less than 20% of the chord length at the blade tip of the first compressor blade.

7. The gas turbine compressor of claim 1, wherein the first compressor blade and the second compressor blade are aerodynamically mistuned to generate different shock patterns when the compressor operates in supersonic flow regimes.

8. The gas turbine compressor of claim 1, wherein the leading edge tip cutback defines a tip portion of the leading edge of the second compressor blade that extends linearly between an upstream inflection point and a downstream inflection point, the upstream inflection point located at a junction between the leading edge of the airfoil and the tip portion, and the downstream inflection point located at a junction between the tip portion and an outer edge of the blade tip.

9. The gas turbine compressor of claim 1, wherein the first compressor blade and the second compressor blade generate different shock patterns and/or aerodynamic instabilities when the compressor operates in supersonic flow regimes, the different shock patterns and/or aerodynamic instabilities mitigating at least one of supersonic flutter and resonant stresses in the compressor blades.

10. The gas turbine compressor of claim 1, wherein the at least one tip cutback of the second compressor blade further includes a pressure side tip pocket disposed at the blade tip of the second compressor blade and extending radially inwardly from the blade tip on the pressure side of the airfoil of the second compressor blade.

11. The gas turbine compressor of claim 1, wherein the first compressor blade is free of leading edge tip cutbacks and free of tip pockets.

12. The gas turbine engine compressor of claim 1, wherein the first compressor blade includes an axial tip projection thereon, the axial tip projection extending axially forwardly relative to a baseline leading edge of the majority of the airfoil of the first compressor blade.

13. The gas turbine compressor of claim 1, wherein the compressor rotor is a fan of a turbofan engine.

14. A gas turbine compressor for an aircraft engine, the compressor comprising a compressor rotor having a hub from which a plurality of airfoil blades extend to outer blade tips, the airfoil blades each having an airfoil selected from at least first and second airfoil types and arranged on the hub as alternating with one another around a circumference of the rotor, the second airfoil types including a leading edge having a leading edge tip cutback extending to the outer blade tip thereof, the first airfoil types and the second airfoil types being identical but for the leading edge tip cutback on the outer blade tip of the second airfoil types, wherein the leading edge tip cutback defines a chord length at the blade tip of the second airfoil types that is less than a chord length at the blade tip of the first airfoil types, the first and second airfoil types generating different shock patterns and/or aerodynamic instabilities when the compressor rotor operates in supersonic flow regimes, and wherein the chord length at the blade tip of the second airfoil types is greater than 75% and less than 100% of the chord length at the blade tip of the first airfoil types.

15. The gas turbine compressor of claim 14, wherein the leading edge tip cutback is disposed within a radially outermost 15% of a total span length of the second airfoil types.

16. The gas turbine compressor of claim 14, wherein the leading edge tip cutback defines a tip portion of the leading edge of the second airfoil types that extends between an upstream inflection point and a downstream inflection point, the upstream inflection point located at a junction between the leading edge of the second airfoil types and the tip portion thereof, and the downstream inflection point located at a junction between the tip portion and an outer edge of the blade tips.

\* \* \* \* \*